United States Patent [19]

Robertson

[11] Patent Number: 4,738,532
[45] Date of Patent: Apr. 19, 1988

[54] METHOD OF CALIBRATING AN OPTICAL MEASURING SYSTEM

[75] Inventor: Kenneth D. Robertson, Springfield, Va.

[73] Assignee: The United States of America as represented by the Secretary of the Army, Fort Belvoir, Va.

[21] Appl. No.: 711,888

[22] Filed: Mar. 14, 1985

Related U.S. Application Data

[63] Continuation-in-part of Ser. No. 435,833, Oct. 21, 1982, abandoned.

[51] Int. Cl.$^4$ .............................................. G01B 11/26
[52] U.S. Cl. ...................................... 356/153; 33/283
[58] Field of Search ............... 356/138, 143, 153, 250; 33/1 T, 281, 282, 283, 286

[56] References Cited

U.S. PATENT DOCUMENTS

| | | | |
|---|---|---|---|
| 3,059,520 | 10/1962 | Tsubokawa | 356/250 |
| 3,257,896 | 6/1966 | Mills | 356/138 |
| 3,628,869 | 12/1971 | Clay et al. | 356/153 |

Primary Examiner—R. A. Rosenberger
Attorney, Agent, or Firm—Darrell E. Hollis

[57] ABSTRACT

A method is disclosed for calibrating an optical measuring system (14, 18, 20, 22) of the type which reproducibly projects a beam of light (16) over an extended period of time. The deviation between an incident beam and a rerflected beam is measured on both sides (30, 32) of a parallel-sided calibration mirror (28).

10 Claims, 4 Drawing Sheets

METHOD OF CALIBRATING AN OPTICAL MEASURING SYSTEM

STATEMENT OF GOVERNMENT INTEREST

The invention described and claimed herein may be manufactured and used by or for the Government of the United States of America for governmental purposes without the payment of royalties thereon or therefor.

CONTINUATION-IN-PART

This is a continuation-in-part of application Ser. No. 435,833 filed Oct. 21, 1982 by Kenneth D. Robertson titled Method of Calibrating an Optical Measuring System now abandoned.

DESCRIPTION

1. Technical Field

The present invention concerns methods and apparatuses for measuring angles and changes in angles by projecting light beams onto mirrors and measuring the angle between the incident and reflected beams. More particularly, the invention concerns a method for determining the amount, if any, by which a projected beam varies from true horizontal, that is, from perpendicularity to the gravity vector.

2. Background Art

Many applications are known in which it is desired to measure the angle or the change of angle between a reference axis and a surface of an object. For example, in major load-bearing structures such as large buildings, water retaining dams, canal locks and the like, it is known to periodically measure the tilt of the vertical surfaces of the structure in order to detect unacceptably high stresses or deformations which may occur over a period of time.

A considerable variety of techniques have been developed over the years for measuring tilt in such structures. In accordance with one known technique, the structure is provided with one or more fixed mirrors against which a beam of light is projected, variations in the angle between the incident beam and the reflected beam being indicative of changes in the tilt of the structure to which the mirror is affixed. A difficulty in such measurement systems is that of providing a known reference axis which does not move with the structure. If the geometric relationship between the incident beam of light and the reference axis is known and relatively constant from time to time, then small changes in the tilt of the structure can be accurately measured.

One example of a prior art optical device used for measuring such small changes in angular orientation is an autocollimator which will project a collimated beam of light against a mirror. The reflected light reenters the autocollimator and the difference in angle between the projected light and the reflected light may be measured with a high degree of accuracy. A discussion of the operating principles and uses of such autocollimators appears in a book entitled Metrology with Autocollimators by K. J. Hume and published by Hilger and Watts Ltd., London (1965).

The simplest reference axis for the use of such an autocollimator is the gravity vector. If the autocollimator's optical axis can be made perpendicular to the direction of the gravity vector, measurements can be made of a mirror's change in angular orientation with respect to the vertical and the tilt of a structure can be determined. Although various techniques for accurately providing a horizontal beam of light have been developed for use in the laboratory, a need has continued to exist for a simple, reliable technique for on-site or field determinations of any variation of a projected beam from perpendicularity to the gravity vector, that is, from horizontal.

DISCLOSURE OF THE INVENTION

An object of the present invention is to provide a method of calibrating an optical measuring system of the type which projects a beam of light, to determine any variation of the beam from the horizontal.

A further object of the invention is to provide such a method which does not require the use of heavy, complicated equipment and which can be simply, reliably used in the field.

These objects of the invention are given only by way of example. Thus, other desirable objectives and advantages inherently achieved by the disclosed method may occur or become apparent to those skilled in the art. Nonetheless, the scope of the invention is to be limited only by the appended claims.

The method according to the present invention is particularly useful for calibrating optical measuring systems of the type which, over an extended period of time of a day or more, will reproducibly project a beam of light along a line of sight which may not be absolutely horizontal although it is reproducible. One such system is a common piece of surveying equipment known as an automatic level, such as the Zeiss Model Ni2. Automatic levels are designed to be mounted on top of a surveyor's tripod and can be set up in a few minutes. All that is required after set-up of the instrument is to center a circular bubble of low sensitivity. At this point, a pendulum compensator within the instrument produces a final leveling. Repeated set-up of the instrument will produce the same line of sight if the instrument is not physically abused. The line of sight of the level, including the center of its cross-hair, may not be perfectly horizontal and may change over an extended period of time.

An automatic level can be provided with an autocollimating eyepiece which comprises a small lamp, a half silver diagonal mirror, a reticle for reading angles and an additional eyepiece for viewing the reading reticle. When the lamp is turned on, it illuminates the cross-hair of the level. Focus of the level is set for infinity and the objective lens of the level projects an image of the cross-hair along a collimated beam against a plain mirror, the tilt of which is to be measured. The mirror, which is usually placed within a few inches to a few feet from the instrument, reflects the cross-hair image back into the level where it comes to a focus in the plane of the original cross-hair. An observer looking into the eyepiece will see both the cross-hair and its image, with the displacement between the two being proportional to the degree of tilt of the mirror. The observer will also see the measuring reticle graduated in increments of, say, 10 arc seconds. Using this reticle and the displacement between the cross-hair and its image, a quantitative measurement may be made of the tilt of the mirror with respect to the optical axis of the level.

A trained observer usually can interpolate the position of the cross-hair in an automatic level with an autocollimating eyepiece to the nearest one or two seconds between divisions; however, a better way is to use an optical vernier. This is simply a prism or wedge of glass placed in front of the objective lens of the level. The vernier is used to deviate the line of sight by a known amount. By rotating the wedge, any deviation of the line of sight may be obtained within the limits set by the wedge angle. A scale is provided which shows seconds of deviation of the cross-hair as a function of the rotation of the wedge.

To calibrate such an optical measuring system in accordance with the invention, to determine any variation of its projected beam from the horizontal, a calibration mirror is provided which has first and second essentially parallel reflecting faces. The mirror faces preferably are ground and polished to parallelism within 0.5 arc seconds. The mirror is mounted in an approximately vertical position and a reading of tilt is made on one face with the optical measuring system. Without moving the mirror, the measuring system is then used to measure tilt on the other face. If the mirror is perfectly vertical, both readings will be the same and each will contain any errors of the measuring system. If the mirror is not vertical, the two readings will not agree but the mean of the two will be the variation of the projected beam from horizontal.

BEST MODE FOR CARRYING OUT THE INVENTION

Figure 1:
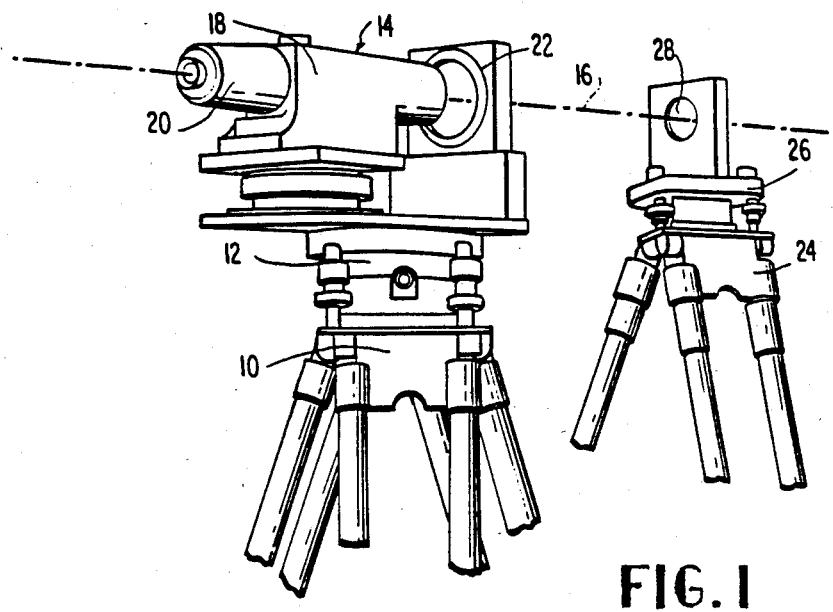
FIG. 1 shows a fragmentary perspective view of an optical measuring system of the general type useful in the method according to the invention and a calibration mirror of the type used in the method.

The invention will be described with reference to the drawing in which like reference numerals identify like elements of structure in each of the several Figures.

FIG. 1 shows a fragmentary view of the apparatus used in the method according to the invention, including a surveyor's tripod 10 which supports a tribach 12, a device used for attaching surveying equipment to the top of the tripod and provided with three leveling screws and a spirit level. Tribach 12 supports an optical measuring system 14 which projects a beam 16 of light along a line of sight at a reproducible angle to the gravity vector. A typical system 14 comprises an automatic level 18, an autocollimating eyepiece 20 and an optical vernier 22, as previously discussed; however, any measuring system which provides a beam at an angle which is reproducible over a day or so may be calibrated using the method of the invention. Positioned in front of measuring system 14 is a second tripod 24 which supports another tribach 26 on which a calibration mirror 28 according to the invention is mounted in an essentially vertical position. Mirror 28 is provided with essentially parallel sides 30, 32 as indicated schematically in FIGS. 2-6. Sides 30, 32 preferably are polished to parallelism within 0.5 arc seconds.

To determine any variation of beam 16 from the horizontal, the deviation of the beam reflected from face 30 of mirror 28 is determined. Then, measuring system 14 is moved to the other side of mirror 28 and the deviation is measured at surface 32. The mean deviation of the two measurements is the variation of beam 16 from horizontal. As discussed above at page 3, lines 12-17, the measuring system 14, due to the automatic level, may be moved with the identical line of sight being projected at each set-up location.

Figure 2:
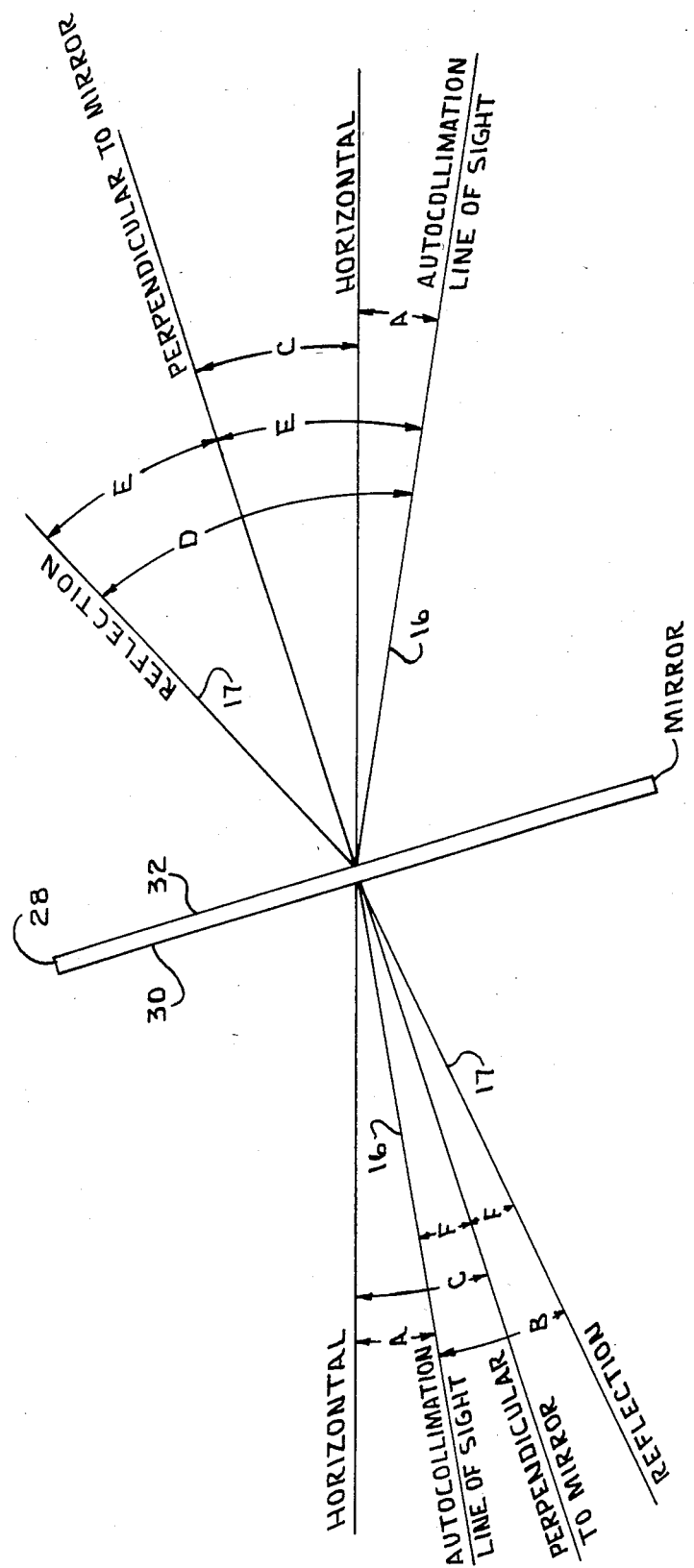
FIG. 2 illustrates schematically the paths of the incident and reflected light beams when the calibration mirror is not vertical and the line of sight of the measuring system is between the horizontal and the perpendicular to the mirror.

FIG. 2 illustrates the paths of incident beam 16 and reflected beam 17 at surfaces 30 and 32 when mirror 28 is not vertical and beam 16 is not horizontal. According to the method, the measuring system 14 is first positioned on the left side of mirror 28. Incident beam 16 strikes surface 30 and is downwardly reflected along line 17. The angle between the incident beam 16 and reflected beam 17 is labeled B. However, the reticle scale on the autocollimating eyepiece 20 reads one-half of B. This is because the autocollimating eyepiece provides a measure of the angle F between the perpendicular to the surface 30 and the line of sight of the autocollimator, i.e., the line of sight of the incident beam. This angle between the perpendicular to the surface 30 and the line of sight of the autocollimator is one-half of the angle B formed between the incident beam 16 and the reflected beam 17.

Once the angle F is measured the measuring system 14 is repositioned on the right side of mirror 28. The incident beam 16 strikes surface 32 and is reflected upwards along line 17. An angle D is formed between incident beam 16 and reflected beam 17. Of course, here again, the autocollimating eyepiece 20 provides a reading of one-half angle D or angle E on its reticle scale. Now that angles F and E have been measured, the deviation or error angle A may be calculated. Error angle A is the angle between the horizontal and the line of sight 16 of the autocollimator. The error angle A is identical on both the right and left side of mirror 28.

From FIG. 2 a mathematical derivation of the error angle A, i.e., the angle between the autocollimator line of sight 16 and the horizontal, follows:

| LEFTSIDE | | RIGHT SIDE | |
|---|---|---|---|
| $B = 2F$ | (1) | $D = 2E$ | (2) |
| $A = C - F$ | (3) | $A = E - C$ | (4) | where:
A is the error angle.
B is the angle between the incident beam and the reflected beam from surface 30.
C is the angle between the horizontal and the perpendicular to the mirror.
D is the angle between the incident beam and the reflected beam from surface 32.
E is the angle between either the incident or the reflected beam from surface 32 and the perpendicular to the mirror 28.

F is the angle between either the incident or the reflected beam from surface 30 and the perpendicular to the mirror 28.

Combining (3) and (4)

$$A = \frac{E - F}{2} \quad (5)$$

Substituting (1) and (2) into (5)

$$A = \frac{D - B}{4} \quad (6)$$

However, the autocollimator reticle scale as graduated shows angles measured above the horizontal as positive and angles measured below the horizontal as negative. Accordingly, as read from the autocollimator scale angles F and B in FIG. 2 are negative. Reflecting this fact equations (5) and (6) become $$A = \frac{E + F}{2} \quad (7)$$

$$A = \frac{D + B}{4} \quad (8)$$

when reading directly off the autocollimator reticle scale equations (7) or (8) provide the correct measure of angle A. Remember that the autocollimator reticle scale provides a direct reading of angles E and F. Angles E and F must be multiplied by two to yield angles D and B respectfully.

Figure 3:
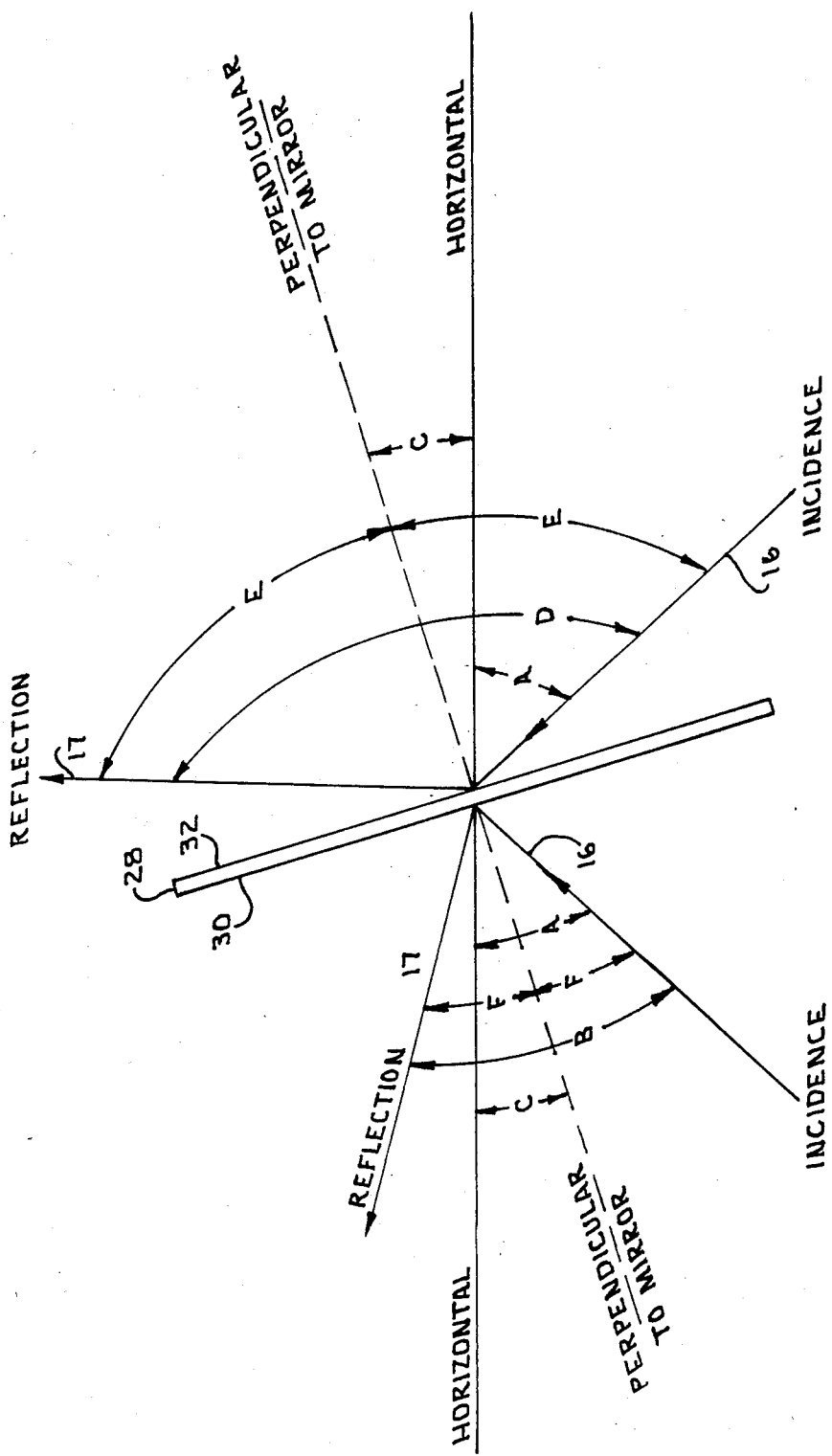
FIG. 3 illustrates schematically the paths of the incident and reflected light beams when the calibration mirror is not vertical and the line of sight of the measuring system is below the horizontal and the perpendicular to the mirror.

Now turning to FIG. 3, the situation is illustrated where the incident beam 16 on both sides of mirror 28 provides an upwards angle resulting in a reading of positive angles for both E and F on the autocollimator reticle scale. In this situation, it is more convenient to use equation (5) or (6) above to determine error angle A. If the incident beam 16 was directed downwards to the horizontal instead of upwards as shown in FIG. 3 at the same angle A then both angles B and D would be read as negative on the reticle scale.

Figure 4:
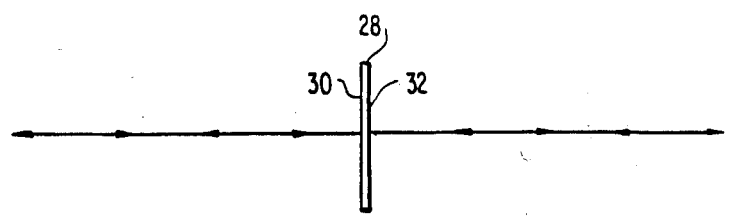
FIG. 4 illustrates schematically the paths of the incident and reflected light beams when the calibration mirror is vertical and the line of the sight of the measuring system is horizontal.

FIG. 4 illustrates the paths of incident and reflected beams at surfaces 30 and 32 when mirror 28 is vertical and beam 16 is horizontal. In this situation, angle B and D are zero resulting in an error angle of zero showing that the measuring system 14 is accurately calibrated.

Figure 5:
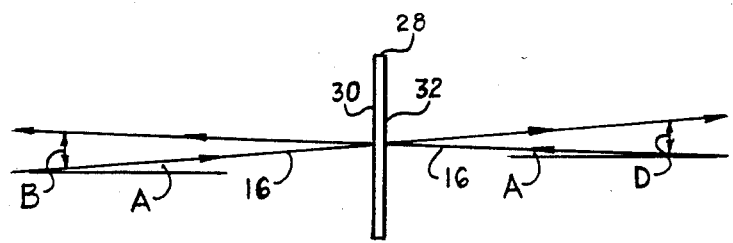
FIG. 5 illustrates the paths of the incident and reflected beams when the calibration mirror is vertical but the line of sight of the measuring system is not horizontal.

FIG. 5 illustrates the paths of the incident and reflected beams at surfaces 30, 32 when mirror 28 is vertical but beam 16 is angled upward relative to horizontal. In this situation, an upward angle B/2 is measured at surface 30 and an upward angle D/2 is measured at surface 32. In this situation, the autocollimator reticle scale provides a positive or upward angle reading of B/2 for the beam striking surface 30 and a positive or upward angle reading of D/2 for the beam striking surface 32. Plugging these values into equation (5) or (6) above yields an error angle of zero which is incorrect. Accordingly, equations (5) and (6) cannot be used when the mirror 28 is vertical. However, when the mirror 28 is vertical the perpendicular to the gravity vector and the perpendicular to the mirror are parallel. Accordingly, since measured angle D equals measured angle B, the error angle A equals one-half of angle D or angle B or the angle read directly from the autocollimator reticle scale—angle E or angle F. Note in this case angle E equals angle F. If the incident beam 16 is angled downward relative to horizontal angle B and angle D will be read as negative on the reticle scale and each equal to twice the error angle A.

Figure 6:
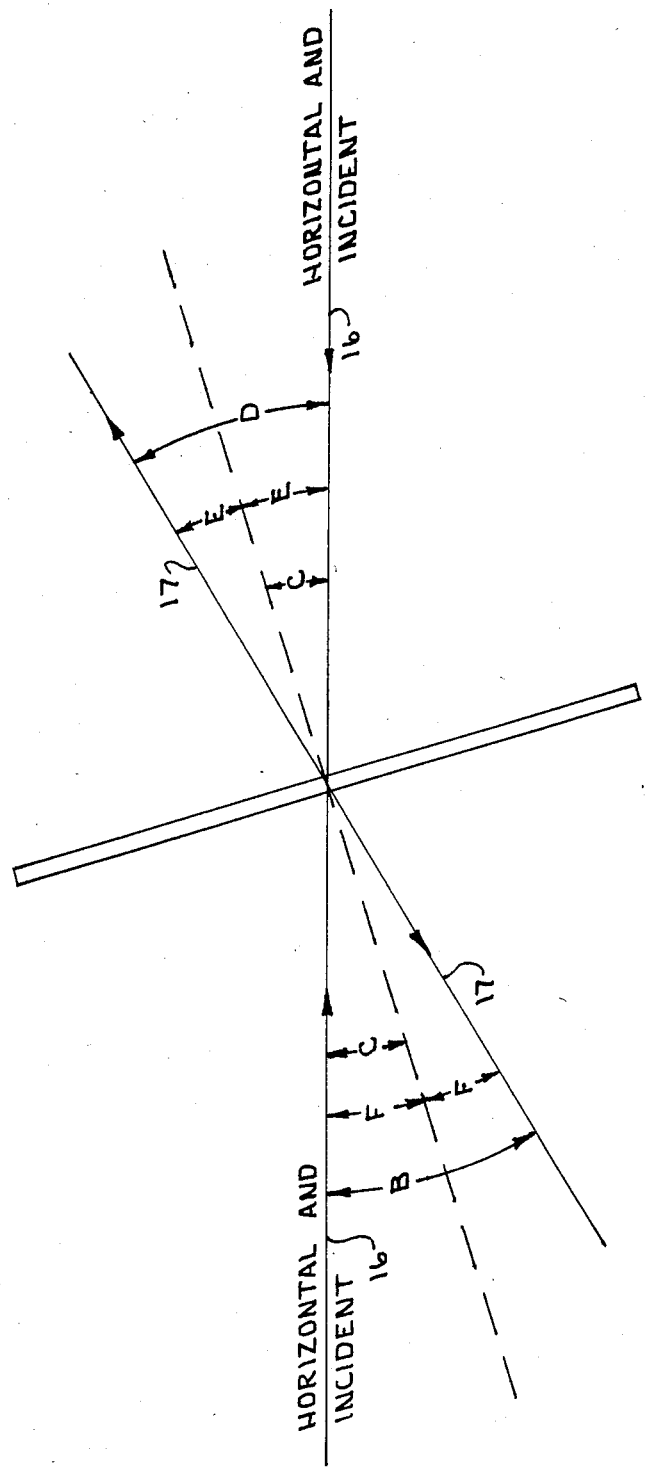
FIG. 6 illustrates the paths of the incident and reflected light beams when the calibration mirror is not vertical and the line of sight is horizontal.

FIG. 6 illustrates the paths of incident and reflected beams 16 and 17 at surfaces 30 and 32 when the line of sight is horizontal and the mirror 28 is not vertical. In this situation, angle D equals angle B and error angle A equals zero. Angle D is an upward or positive angle and angle B is a downward or negative angle. Accordingly, use of equations (5) or (6) result in the correct deviation or error angle A, i.e., zero.

In practice, the situation of FIGS. (5) and (6) may be distinguished by the fact that, even though in both situations angle B equals angle D, in FIG. 5 both angle D and angle B will be either positive or negative while in FIG. 6 angle B and angle D will be of opposite signs. Remember a positive or upwards angle will be read as a positive angle on the autocollimator reticle scale while a negative or downwards angle will be read as a negative angle the autocollimator reticle scale.

Likewise, the situation of FIGS. 2 and 3 may be distinguished in the identical manner. Note in the FIG. 2 situation that angle B and angle D are of opposite signs while in the FIG. 3 situations angle B and angle D are either both positive or both negative.

To check for drift in calibration, using the method described above, such measurements should be taken at the beginning and end of each day's use of a measuring system.

INDUSTRIAL APPLICABILITY

While the invention has been described with particular reference to calibrating systems for measuring the tilt of a large structure, those skilled in the optical measuring arts will understood that the method according to the invention also can be used in other applications where it is desired to measure the variation from horizontal of a reproducibly projected beam.

Having described my invention in sufficient detail to enable those skilled in the art to make and use it, I claim:

1. A method of calibrating an optical measuring system of the type which reproducibly projects a beam of light along the same line of sight, to determine any variation of the beam from perpendicularity to the gravity vector, comprising the steps of:
   providing a calibration mirror having first and second substantially parallel reflecting faces;
   positioning said mirror with its faces approximately vertical;
   causing said beam to impinge on said first face at an unknown angle defined by the angle between the line of incidence of the impinging beam and a line perpendicular to the gravity vector;
   measuring the angle between the incident beam and the reflected beam on said first face;
   causing said beam to impinge on said second face, at said unknown angle without moving said mirror,
   measuring the angle between the incident beam and the reflected beam on said second face; and
   determining any variation from perpendicularity to the gravity vector by the projected beam, by using the measured angles.

2. The method of claim 1 wherein the step of determining includes calculating said unknown angle (A) by using the formula $$A = \frac{D - B}{4}$$

where
- D = the angle between the incident beam and the reflected beam on said second face; and
- B = the angle between the incident beam and the reflected beam on said first face;

when D is not equal to B.

3. The method of claim 1 wherein the step of causing said beam to impinge on said first face includes, positioning an autocollimator to provide said first beam; wherein the step of measuring the angle between the incident beam and the reflected beam on said first face includes, reading the angle from an reticle scale associated with the autocollimator wherein the reticle scale indicates one-half the actual angle and indicates a positive angle for angles measured above the perpendicular to the gravity vector and a negative angle for angles measured below the perpendicular to the gravity vector;

wherein the step of causing said beam to impinge on said second face includes, positioning the autocollimator to provide said second beam; and wherein the step of measuring the angle between the incident beam and the reflected beam on said second face includes, reading the angle from the reticle scale associated with the autocollimator.

4. The method of claim 3 wherein the step of determining includes calculating said unknown angle (A) by using the formula $$A = \frac{E - F}{2}$$

where
- E = the absolute value of the angle indicated by the reticle scale for the first face;
- F = the absolute value of the angle indicated by the reticle scale for the second fan;

when E is not equal to F and E and F are both positive or both negative as indicated.

5. The method of claim 3 wherein the step of determining includes calculating said unknown angle (A) by using the formula $$A = \frac{E + F}{2}$$

where
- E = the absolute value of the angle indicated by the reticle scale for the first face;
- F = the absolute value of the angle indicated by the reticle scale for the second fan;

where E is not equal to F and E and F are of opposite signs as indicated by the reticle scale.

6. The method of claim 3 wherein the step of determining includes calculating said unknown angle (A) by using the formula $$A = 0$$

when E is equal to F but not zero and E and F are of opposite signs as indicated by the reticle scale, or when E and F both equal zero, where
- E = the absolute value of the angle indicated by the reticle scale for the first face;
- F = the absolute value of the angle indicated by the reticle scale for the second face.

7. The method of claim 3 wherein the step of determining includes calculating said unknown angle (A) by using the formulas $$A = E$$

or $$A = F$$

where
- E = the absolute value of the angle indicated by the reticle scale for the first face;
- F = the absolute value of the angle indicated by the reticle scale for the second face;

when E equals F and E and F are either both positive or both negative as indicated by the reticle scale.

8. The method of claim 1 wherein the step of measuring the angle between the incident beam and the reflected beam on said first face includes indicating whether the angle measured is measured above the perpendicular to the gravity vector (positive) or below the perpendicular to the gravity vector (negative), and wherein the step of measuring the angle between the incident beam and the reflected beam on said second face includes indicating whether the angle measured is measured above the perpendicular to the gravity vector (positive) or below the perpendicular to the gravity vector (negative).

9. The method of claim 8 wherein the step of determining includes calculating said unknown angle (A) by using the formula $$A = 0$$

when D is equal to B but not zero and D and B are of opposite signs or by using the formulas $$A = B/2$$

or $$A = D/2$$

when D is equal to B and D and B are either both positive or both negative.

10. The method of claim 1 wherein the step of determining includes calculating said unknown angle (A) by using the formula $$A = 0$$

when both the measured angles between the incident and reflected beams are equal zero.

* * * * *